(12) United States Patent
Grabowski et al.

(10) Patent No.: US 9,925,924 B1
(45) Date of Patent: Mar. 27, 2018

(54) STEP WITH INTEGRATED MUD SCRAPER AND STORAGE

(71) Applicant: GM GLOBAL TECHNOLOGY OPERATIONS LLC, Detroit, MI (US)

(72) Inventors: Thomas P. Grabowski, Shelby Township, MI (US); Daniel C. Gifford, Sterling Heights, MI (US); Brian M. Izard, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/609,470

(22) Filed: May 31, 2017

(51) Int. Cl.
  *B60R 3/04* (2006.01)
  *B60R 3/02* (2006.01)
  *B60R 3/00* (2006.01)

(52) U.S. Cl.
  CPC ..................... *B60R 3/04* (2013.01)

(58) Field of Classification Search
  CPC .... B60R 3/04; B60R 3/02; B60R 3/00; B60R 3/002
  See application file for complete search history.

(56) References Cited

U.S. PATENT DOCUMENTS

| | | | | |
|---|---|---|---|---|
| 1,768,375 A | * | 6/1930 | Santhony | B60R 3/04 15/237 |
| 2,501,819 A | * | 3/1950 | Kloepper | B60R 3/04 15/238 |
| 2,843,870 A | * | 7/1958 | Perry | A47L 23/22 15/237 |

* cited by examiner

Primary Examiner — Bryan A Evans
(74) Attorney, Agent, or Firm — Quinn IP Law

(57) ABSTRACT

A step includes an integrated mud scraper and storage. The step may be part of a vehicle and, therefore, may be coupled to a vehicle body of the vehicle. The step includes a step body. The step body defines a stepping surface. The step body defines an opening extending through the stepping surface. The step includes at least one scraper extending from the stepping surface, wherein the scraper is obliquely angled relative to the stepping surface. The scraper is configured to scrape mud on a shoe, and the opening is configured to receive the mud scraped by the scraper. The scraper has a first scraper end and a second scraper end opposite the first scraper end. The first scraper end may be directly coupled to the stepping surface. The second scraper edge defines a scraping edge, and the scraping edge is aligned with the opening.

19 Claims, 2 Drawing Sheets

STEP WITH INTEGRATED MUD SCRAPER AND STORAGE

INTRODUCTION

The present disclosure relates to a step for a vehicle. In particular, the present disclosure relates to a step with an integrated mud scraper and storage.

People can get their shoes dirty, especially when participating in outdoor activities, such as hiking. For example, mud and debris can stick to shoes. However, most people like to maintain their vehicles clean and do not wish to carry the mud and debris into the vehicle.

SUMMARY

The present disclosure describes a step with an integrated mud scraper and storage. This step can be used to remove mud and debris from a shoe or other objects. The step may be part of a vehicle and, therefore, may be coupled to a vehicle body of the vehicle. For example, the step may be attached to a pickup box or a side of a vehicle.

In certain embodiments, the step includes a step body. The step body defines a stepping surface. The step body defines an opening extending through the stepping surface. The step includes at least one scraper extending from the stepping surface, wherein the scraper is obliquely angled relative to the stepping surface. The scraper is configured to scrape mud on a shoe, and the opening is configured to receive the mud scraped by the scraper. The scraper has a first scraper end and a second scraper end opposite the first scraper end. The first scraper end may be directly coupled to the stepping surface. The second scraper end defines a scraping edge, and the scraping edge is aligned with the opening along a vertical direction to allow mud scraped by the scraping edge to fall into the opening. The scraper may be configured as a flange.

The step body includes a first body end and a second body end. The second body end may be directly coupled to the vehicle body such that the step body is cantilevered from the vehicle body, and the scraper is closer the first body end than to the second body end. The opening is closer to the first body end than to the second body end, and the first body end is closer to the first scraper end than to the opening. The step body defines a channel in direct communication with the opening to allow the mud received by the opening to be displaced into the channel. The channel may be entirely disposed inside the step body. The opening may be referred to as a first opening, and the step body defines a second opening leading outside of the step. The second opening is in direct communication with the channel to allow mud in the channel to be displaced outside of the step.

The channel includes a first channel segment and a second channel segment in communication with the first channel segment. The first channel segment is perpendicular to the stepping surface to allow the mud moving through the opening to be displaced into the channel. The second channel segment may be in direct communication with the first channel segment. The second channel segment may be in direct communication with the second opening. The second channel segment is obliquely angled relative to the first channel segment.

The step includes one or more treads extending directly from the stepping surface. The tread has a tread height. The scraper has a scraper height, and the scraper height is equal to the tread height.

The above features and advantages and other features and advantages of the present disclosure are readily apparent from the following detailed description of the best modes for carrying out the disclosure when taken in connection with the accompanying drawings.

DETAILED DESCRIPTION

Figure 1:
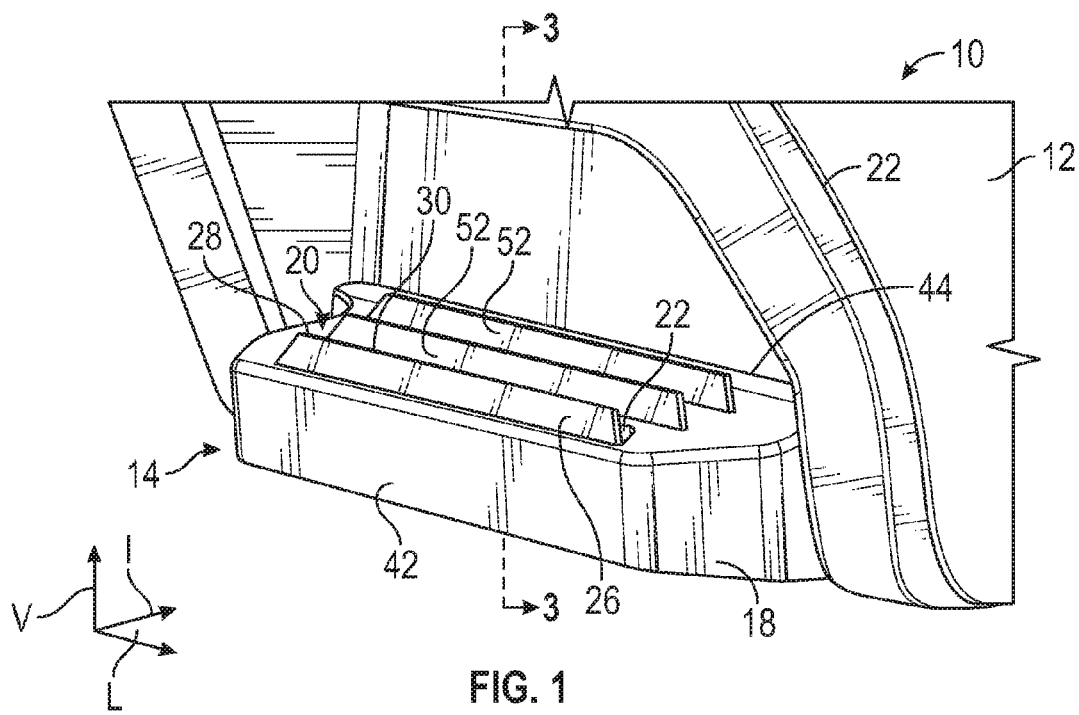
FIG. 1 is a schematic isometric view of a portion of a vehicle including a step in accordance with the present disclosure.
Figure 2:
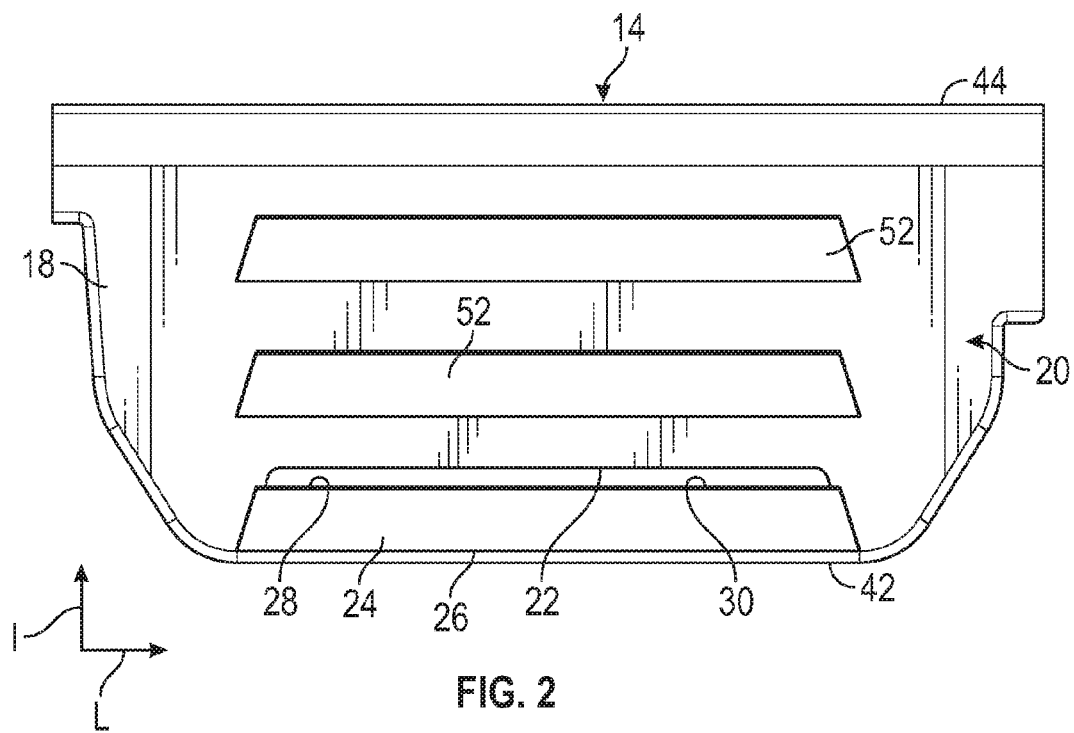
FIG. 2 is a schematic top view of the step shown in FIG. 1.
Figure 3:
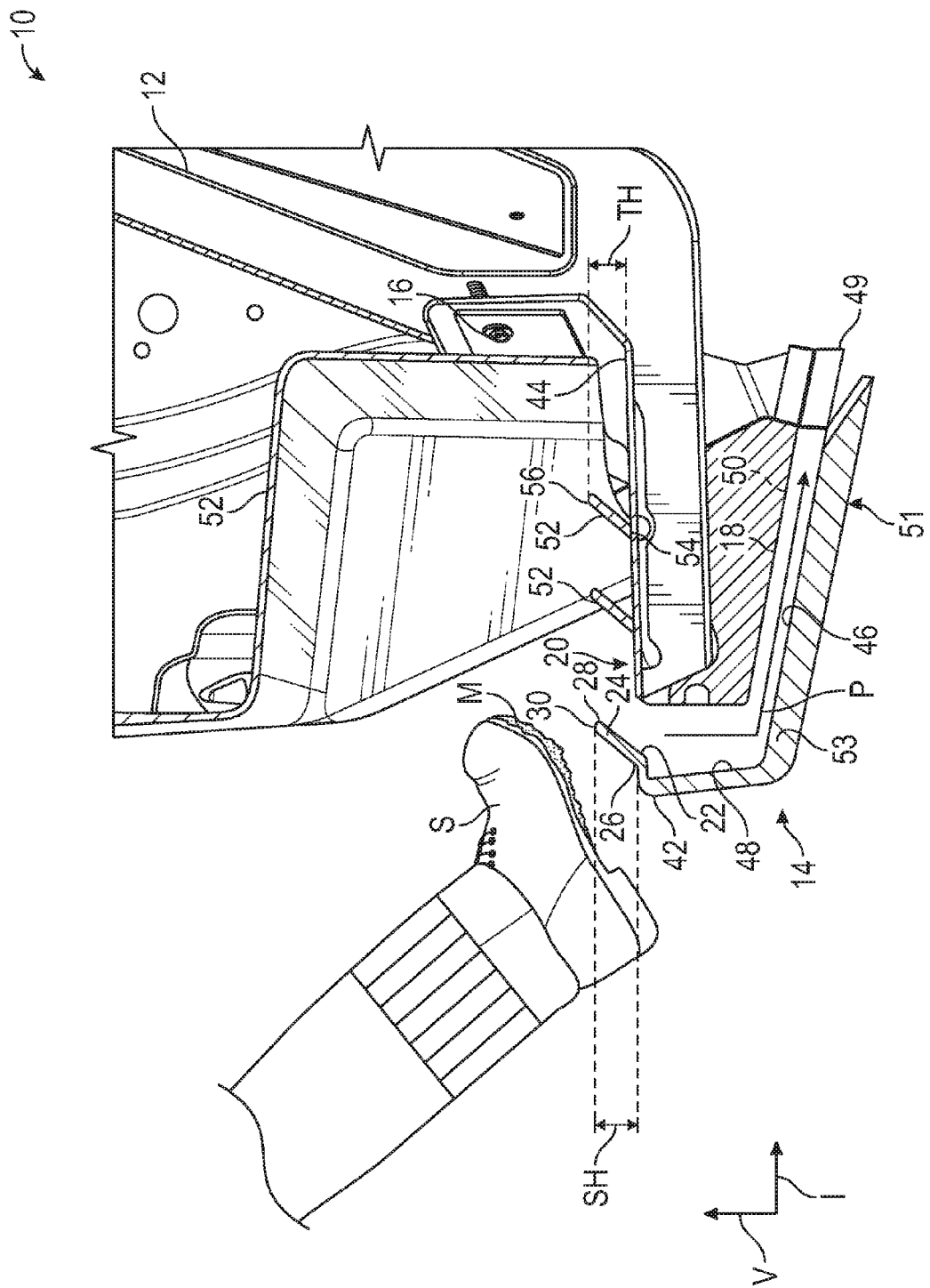
FIG. 3 is a schematic cross-sectional side view of the portion of the vehicle shown in FIG. 1, taken along section line 3-3 of FIG. 1.

With reference to FIGS. 1-3, a vehicle 10 includes a vehicle body 12 and a step 14 coupled to the vehicle body 12. The vehicle 10 may be a land vehicle, such as a car or a truck, or other types of vehicles. The step 14 may be coupled to a side of the vehicle 10 to help passengers get into the vehicle 10. Alternatively or additionally, the step 14 may be coupled to the pickup truck box of the vehicle 10 to help users reach objects in the pickup box. The step 14 may be, for example, a bumper step. As a non-limiting example, the step 14 may be directly coupled to the vehicle body 12 to enhance the rigidity of the step 14. One or more fasteners 16 may directly interconnect the vehicle body 12 and the step 14. The step 14 includes a step body 18 configured to bear the weight of an adult human. To this end, the step body 18 may be wholly or partly made of rigid material, such as a rigid polymeric material or a rigid metallic material. The step body 18 defines a stepping surface 20 configured to receive a shoe S. When using the step 14, a user steps on the stepping surface 20 and places a shoe S on the stepping surface 20. The stepping surface 20 may extend along an inboard direction I and a lateral direction L. The lateral direction L is perpendicular to the inboard direction. The step body 18 defines an opening 22 extending through the stepping surface 20. The step 14 includes at least one scraper 24 extending from the stepping surface 20. The scraper 24 is configured to scrape mud M and debris stuck on the user's shoe S. To facilitate scraping, the scraper 24 is obliquely angled relative to the stepping surface 20 and is wholly or partly made of a rigid material. For example, the scraper 24 may be wholly or partly made of a rigid polymeric material or a rigid metallic material. The opening 22 is configured to receive the mud M scraped by the scraper 24.

The scraper 24 may be configured as a flange and has a first scraper end 26 and a second scraper end 28 opposite the first scraper end 26. The first scraper end 26 of the scraper 24 is directly coupled to the stepping surface 20. The second scraper end 28 defines a scraping edge 30. The scraping edge 30 is configured to scrap the mud M stuck on the shoe S. In addition, the scraping edge 30 is aligned with the opening 22 along a vertical direction V to allow the mud M scraped by the scraping edge 30 to fall into the opening 22. The vertical direction V is perpendicular to the inboard direction I and the lateral direction L.

The step body 18 includes a first body end 42 and a second body end 44 opposite the first body end 42. The second body end 44 of the step body 18 is directly coupled to the vehicle body 12. As such, the step body 18 is cantilevered from the vehicle body 12 to facilitate stepping on the step 14. The scraper 24 is closer the first body end 42 than to the second body end 44 of the step body 18 to make it easier to scrape the mud M stuck on the shoe S. Also, to facilitate scraping the mud M, the opening 22 is closer to the first body end 42 than to the second body end 44 of the step body 18, and the first body end 42 is closer to the first scraper end 26 of the scraper 24 than to the opening 22. The opening 22 is located inboard relative to the first scraper end 26 of the scraper 24.

With specific reference to FIG. 3, the step body 18 defines a channel 46 in direct communication with the opening 22 to allow the mud M received by the opening 22 to be displaced into the channel 46. The channel 46 may be entirely disposed inside the step body 18 to allow storage of the mud M and debris scraped by the scraper 24. The mud M and debris stored in the channel 46 can later be washed out. The opening 22 may be referred to as a first opening, and the step body 18 defines a second opening 49 leading outside of the step 14. The second opening 49 is in direct communication with the channel 46 to allow the mud M in the channel 46 to be displaced outside of the step 14 following the path P.

The channel 46 includes a first channel segment 48 and a second channel segment 50 in communication with the first channel segment 48. The first channel segment 48 is perpendicular (or substantially perpendicular) to the stepping surface 20 to allow the mud M moving through the opening 22 to be displaced into the channel 46 by the earth gravitational force. The second channel segment 50 may be in direct communication with the first channel segment 48 to allow smooth displacement of the mud M through the channel 46 The second channel segment 50 is in direct communication with the second opening 49, thereby allowing the mud M to quickly exit the step 14. The second channel segment 50 is obliquely angled relative to the first channel segment 48, allowing the mud M to be stored in the second channel segment 50 while also facilitating removal of the mud M during the washing process. The step body 18 includes a lowermost surface 51 opposite the stepping surface 20. The lowermost surface 51 may be obliquely angled relative to the stepping surface 20 and is part of lowermost wall 53 that supports the second channel segment 50. The second channel segment 50 is also obliquely angled relative to the stepping surface 20. The lowermost wall 53 is obliquely angled to the stepping surface 20 to support the second channel segment 50, which is also obliquely angled relative to the stepping surface 20. The second channel segment 50 is obliquely angled relative to the stepping surface 20 to facilitate removal of mud M stored in the channel 46 while washing out the step 14. The second opening 49 is closer to the lowermost surface 51 than to the stepping surface 20 to also facilitate removal of the mud M stored in the channel 46.

The step 14 includes one or more tread 52 extending directly from the stepping surface 20. Each of the treads 52 may be obliquely angled relative to the stepping surface 20. Further, each of the treads 52 has a first tread end 54 and a second tread end 56 opposite the first tread end 54. The first tread end 54 of the tread 52 is directly coupled to the stepping surface 20. The tread has a tread height TH. The tread height TH is the distance from the first tread end 54 to the second tread end 56 along the vertical direction V. The scraper 24 has a scraper height SH. The scraper height SH is the distance form the first scraper end 26 to the second scraper end 28 along the vertical direction V. The scraper height SH is equal to the tread height TH to enhance comfort when the user steps on the step 14.

During use, the user can scrape the shoe S on the scraper 24 to remove the mud M and debris stuck on his shoe S. Then, the mud M and debris falls through the opening 22 and into the first channel segment 48 of the channel 46 due to the gravitational force. The mud M continues to move from the first channel segment M to the second channel segment 50. Because the second channel segment 50 is not completely vertical, the mud M and debris scraped from the shoe S may be stored in the channel 46. Then, the user may use a hose or other cleaning device to wash out the mud M and debris stored in the channel 46. For example, water can be introduced into the channel 46 through the opening 22 (i.e., the first opening), causing the mud M and debris stored in the second channel segment 50 to exit the step 14 and the vehicle 10 through the second opening 49.

While the best modes for carrying out the disclosure have been described in detail, those familiar with the art to which this disclosure relates will recognize various alternative designs and embodiments for practicing the disclosure within the scope of the appended claims.

What is claimed is:

1. A step, comprising:
   a step body including a stepping surface, wherein the step body defines an opening extending through the stepping surface;
   at least one scraper extending from the stepping surface, wherein the scraper is obliquely angled relative to the stepping surface;
   wherein the scraper is configured to scrape mud on a shoe;
   wherein the opening is configured to receive the mud scraped by the scraper; and
   at least one tread extending directly from the stepping surface, wherein the at least one tread has a tread height, the scraper has a scraper height, and the scraper height is equal to the tread height.

2. The step of claim 1, wherein the scraper has a first scraper end and a second scraper end opposite the first scraper end, the first scraper end is directly coupled to the stepping surface, the second scraper end defines a scraping edge, and the scraping edge is aligned with the opening along a vertical direction to allow mud scraped by the scraping edge to fall into the opening.

3. The step of claim 2, wherein the step body includes a first body end and a second body end, the second body end is configured to be coupled to a vehicle body such that the step body is cantilevered from the vehicle body, and the scraper is closer the first body end than to the second body end.

4. The step of claim 3, wherein the opening is closer to the first body end than to the second body end, and the first body end is closer to the first scraper end than to the opening.

5. The step of claim 1, wherein the scraper is configured as a flange.

6. The step of claim 1, wherein the step body defines a channel in direct communication with the opening to allow the mud received by the opening to be displaced into the channel.

7. The step of claim 6, wherein the channel is entirely disposed inside the step body.

8. The step of claim 7, wherein the opening is a first opening, and the step body defines a second opening leading outside of the step, and the second opening in direct communication with the channel to allow mud in the channel to be displaced outside of the step.

9. The step of claim 8, wherein the channel includes a first channel segment and a second channel segment in communication with the first channel segment, and the first channel segment is perpendicular to the stepping surface to allow the mud moving through the opening to be displaced into the channel.

10. The step of claim 9, wherein the second channel segment is in direct communication with the first channel segment, the second channel segment is in direct communication with the second opening, and the second channel segment is obliquely angled relative to the first channel segment.

11. A vehicle, comprising:
   a vehicle body;
   a step coupled to the vehicle body, wherein the step includes a step body, the step body defines a stepping surface, and the step body defines an opening extending through the stepping surface;
   at least one scraper extending from the stepping surface, wherein the scraper is obliquely angled relative to the stepping surface;
   wherein the scraper is configured to scrape mud on a shoe; and
   wherein the opening is configured to receive the mud scraped by the scraper; and
   at least one tread extending directly from the stepping surface, wherein the at least one tread has a tread height, the scraper has a scraper height, and the scraper height is equal to the tread height.

12. The vehicle of claim 11, wherein the scraper has a first scraper end and a second scraper end opposite the first scraper end, the first scraper end is directly coupled to the stepping surface, the second scraper end defines a scraping edge, and the scraping edge is aligned with the opening along a vertical direction to allow mud scraped by the scraping edge to fall into the opening.

13. The vehicle of claim 12, wherein the step body includes a first body end and a second body end, the second body end is directly coupled to the vehicle body such that the step body is cantilevered from the vehicle body, and the scraper is closer the first body end than to the second body end.

14. The vehicle of claim 13, wherein the opening is closer to the first body end than to the second body end, and the first body end is closer to the first scraper end than to the opening.

15. The vehicle of claim 14, wherein the scraper is configured as a flange.

16. The vehicle of claim 15, wherein the step body defines a channel in direct communication with the opening to allow the mud received by the opening to be displaced into the channel.

17. The vehicle of claim 16, wherein the channel is entirely disposed inside the step body.

18. The vehicle of claim 17, wherein the opening is a first opening, and the step body defines a second opening leading outside of the step, and the second opening in direct communication with the channel to allow mud in the channel to be displaced outside of the step.

19. The vehicle of claim 18, wherein the channel includes a first channel segment and a second channel segment in communication with the first channel segment, the first channel segment is perpendicular to the stepping surface to allow the mud moving through the opening to be displaced into the channel, the second channel segment is in direct communication with the first channel segment, the second channel segment is in direct communication with the second opening, and the second channel segment is obliquely angled relative to the first channel segment.

* * * * *